(No Model.)
O. KLATTE.
MACHINE FOR SAWING CHAIN BARS.
No. 523,433. Patented July 24, 1894.
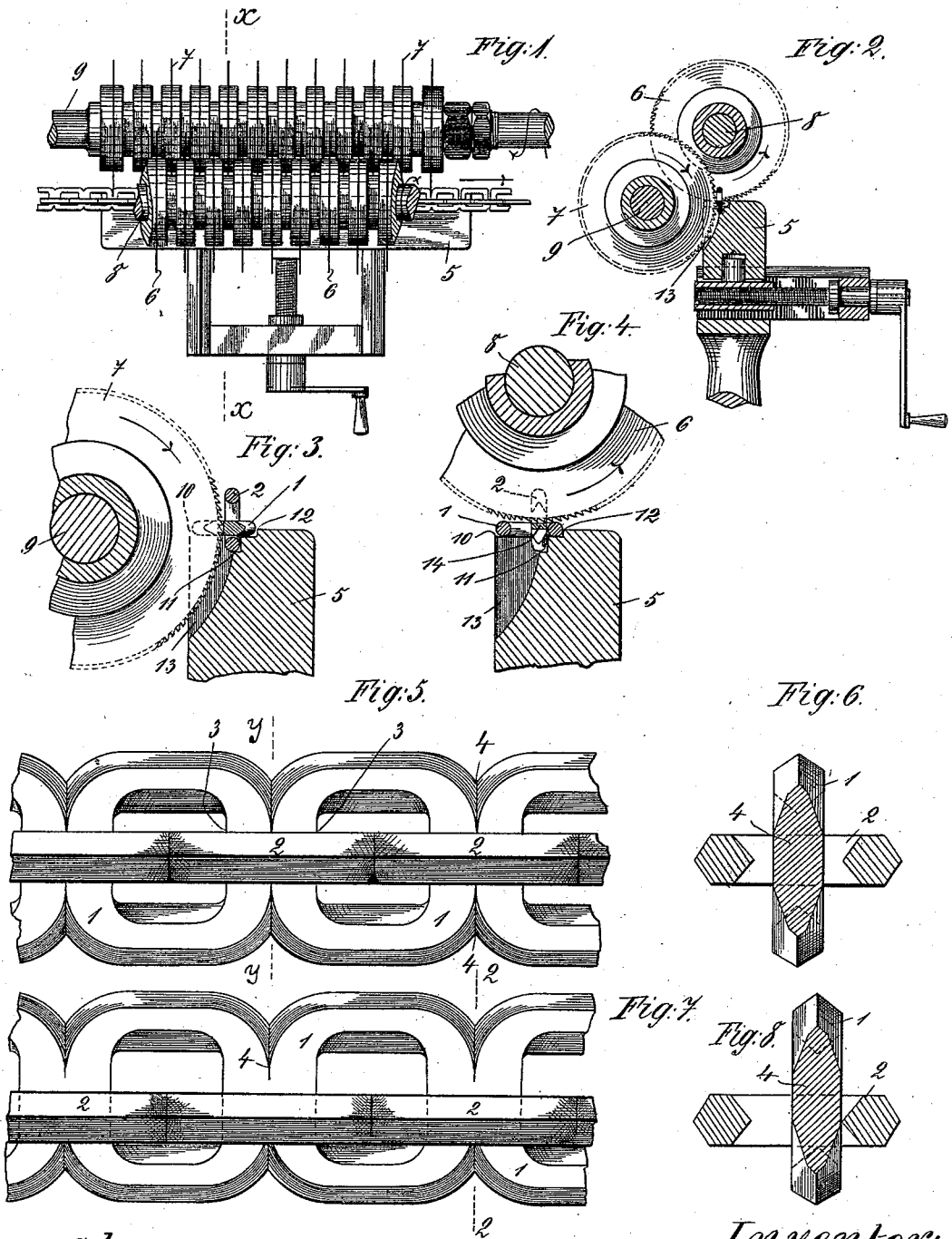
Witnesses:
Peter A. Ross
J. W. Wiman
Inventor:
Otto Klatte
by Henry Connett
his Attorney

UNITED STATES PATENT OFFICE.

OTTO KLATTE, OF NEUWIED, GERMANY.

MACHINE FOR SAWING CHAIN-BARS.

SPECIFICATION forming part of Letters Patent No. 523,433, dated July 24, 1894.

Application filed September 14, 1893. Serial No. 485,487. (No model.)

*To all whom it may concern:*

Be it known that I, OTTO KLATTE, a subject of the King of Prussia, residing at Neuwied-on-the-Rhine, Prussia, in the German Empire, have invented certain Improvements in Machines for Sawing Chain-Bars, of which the following is a specification.

The present invention relates to a machine for sawing into or through cross shaped bars, which have been rolled or stamped into a series of chain links linked together, at those places where the links, which lie in the same plane, adhere together.

This machine is represented in the accompanying drawings, in which—

Figure 1 is a plan of the machine, and Fig. 2 a vertical section in the line $x-x$ in Fig. 1. Figs. 3 and 4 show sections through parts of the machine, drawn to a larger scale. Fig. 5 is a view of the chain with united links, and Fig. 6 a section on the line $y-y$ in Fig. 5. Figs. 7 and 8 are similar views of the chain bar to Figs. 5 and 6, but after the one series of links has been separated from the other by shearing and displaced laterally as shown.

In the chain bar of Figs. 5 and 6, the links lying in the vertical plane are marked 1 and those lying in the horizontal plane are marked 2. The series of links 1 is connected to the series 2 at the parts 3. The separation of the series 1 from the series 2 at these places is effected by shearing in the manner described in my application concerning a "Machine for separating the two series of links of chain bars." The one series of links can then be moved into the position shown in Figs. 7 and 8. The links of each series still adhere together at the places 4, and are separated at these places by the sawing device which forms the subject of the present application. This device (Figs. 1 and 2) consists of a support or bearing, 5, for the two sets of links and of two shafts, 8 and 9, which are provided with circular saws and are mounted one above the bearing and the other at the side of the same. The support or bearing is at the top, left-hand corner at 10 in Fig. 4, grooved out and also provided with a longitudinal groove 11 so that the chain bar, one series of links of which is pushed against the other, can be placed on the support in the position shown in Figs. 3 and 4. The horizontal series of links rests then in the groove 10 with its inner edge against a shoulder 12, while the vertical series is supported with its lower part occupying the groove 11.

The distance between the circular saws is equal to the length of a link, as shown in Fig. 1. The saws, 6, of the shaft 8, alternate with the saws 7, of the shaft 9, and the distance between the saws 7 and the saws 6 is equal to half the length of a link. To enable the saws of the side shaft 9 to operate on the chain links, a notch 13 is made in the support 5 for each saw on this shaft, as seen in Figs. 2, 3 and 4.

Either the support 5 will be movable on prism shaped guides and be advanced to the saws by means of screw and hand crank, or the bearing in which the shafts of the circular saws rest will be made, or caused to swing about a center and so advance the saws to the support 5. The saws, which are driven by toothed gearing or belting, revolve in opposite directions as shown by the arrows in Fig. 2, so that they tend to keep the chain links, which lie on the support, pressed against the same.

The support with the rows of chain links is advanced toward the saws, or the saws toward the support, until the saws 7 have sawed through the metal at the places 4 so far that they nearly touch the vertical row of links (Fig. 3), and the saws 6 have sawed through the metal of the vertical row of links to the same extent (Fig. 4). The support, or the saws, is or are then withdrawn, the rows of chain links lifted from the support, turned through one hundred and eighty degrees, and then pushed against one another, again laid on the support and the saws or the support advanced as before.

According as the movable part of the machine—the saws or the support—shall be advanced more or less, the links can be wholly separated, or there can still be a small web, 14, left between them (Fig. 4), which is torn off afterward by the final forming into the suitable shape or by the final finishing of the links.

The chain bars may be heated before the sawing.

Having fully described my invention, what I desire to claim and secure by Letters Patent is—

1. In a machine for sawing into or through chain bars, the combination of a suitable support or bearing on which the rows of chain-links lie, with two sets of circular saws, arranged and spaced as set forth, whereby, when the row or bar of links and the saws are brought together for separating the links, the saws will cut the same at the proper points, as set forth.

2. In a machine for separating the links of a series or row of chain links connected together, the combination with a support 5, having grooves 10, 11 and 13, of the shafts 8 and 9, arranged as described, and the two sets of saws 6 and 7, on the respective shafts arranged and spaced to correspond with the length of the links, substantially as set forth.

In testimony whereof I have signed my name to this specification in the presence of two subscribing witnesses.

OTTO KLATTE.

Witnesses:
AUGUST MÜHLE,
WLADINIR ZIOLECKI.